(12) United States Patent
Iida

(10) Patent No.: US 6,580,522 B2
(45) Date of Patent: Jun. 17, 2003

(54) DISPLAY DATA CONVERSION APPARATUS AND LED HEAD USING THE APPARATUS

(75) Inventor: Masaru Iida, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 227 days.

(21) Appl. No.: 09/756,225

(22) Filed: Jan. 9, 2001

(65) Prior Publication Data

US 2001/0038368 A1 Nov. 8, 2001

(30) Foreign Application Priority Data

May 8, 2000 (JP) ........................................ 2000-134655

(51) Int. Cl.[7] .................................................. H04N 1/46
(52) U.S. Cl. ........................ 358/1.2; 358/5.07; 382/298; 382/299
(58) Field of Search ................................ 345/112, 127, 345/129, 130, 132; 358/507, 1.2

(56) References Cited

U.S. PATENT DOCUMENTS 5,561,467 A * 10/1996 Takeuchi ..................... 348/427
5,579,132 A * 11/1996 Takahashi .................... 358/527
6,236,388 B1 * 5/2001 Iida ............................ 345/132
2001/0043166 A1 * 11/2001 Jacobsen ..................... 345/27

FOREIGN PATENT DOCUMENTS

JP 02001315378 A * 11/2001 ............. B41J/2/44

* cited by examiner

*Primary Examiner*—Jerome Grant, II
(74) *Attorney, Agent, or Firm*—Armstrong, Westerman & Hattori, LLP

(57) ABSTRACT

An economical display data conversion apparatus for reducing the cost of an LED printer includes a switch matrix circuit and a shift register, wherein the switch matrix circuit has the same number of output terminals as the number of LED cells of an LED array and a smaller number of input terminals than the number of output terminals, multiplies an input signal and outputs the multiplied signal when the LED array having high resolution is caused to emit light at the same resolution as resolution of printing data having a plurality of different kinds of low degrees of resolution, and the shift register includes the same number of registers as the number of input terminals of the switch matrix circuit cascaded with one another, and can cut a predetermined number of registers on the rear stage side by a select switch and a short-circuit. The multiplication ratio of the switch matrix circuit is raised for the printing data having low printing resolution under the state where the use of the rear stage shift register is cut, and printing can be thus carried out.

8 Claims, 13 Drawing Sheets

DISPLAY DATA CONVERSION APPARATUS AND LED HEAD USING THE APPARATUS

BACKGROUND OF THE INVENTION

1. Field of the Invention

This invention relates to a display data conversion apparatus and an LED head apparatus using the conversion apparatus. More particularly, this invention relates to a display data conversion apparatus that reduces the number of shift registers by executing display data conversion, and an LED head apparatus, for use in an LED printer using an LED array as an exposure light source for forming images.

2. Description of the Related Art

An LED printer is one of the forms of electrophotographic image formation apparatuses, and uses a photosensitive head utilizing an LED array as exposure means for optical image data relative to a photosensitive drum. The LED array is constituted as a large number of light emitting diodes (LED) are aligned in an array. In the LED printer, the LED array emits optical image data to the photosensitive drum that is charged by a charger, and an electrostatic latent image is formed on the photosensitive drum. As the photosensitive drum rotates, a toner is allowed to adhere to the electrostatic latent image by a developing device, and is transferred by a transferring device to a sheet of paper. The portion of the photosensitive drum on which the electrostatic latent image is formed is discharged by a discharging device, and a cleaner cleans the photosensitive drum to its original state. The photosensitive drum again reaches the charging device and repeats the operation described above.

Such an LED printer comprises an LED array having LED cells aligned in a predetermined pitch, a shift register having the same number of registers each for storing one image data corresponding to one LED cell, as the number of the LED cells, and an LED driving circuit for driving the LED cells to emit light in accordance with the image data stored in the register.

The arrangement pitch of the LED cells determines the printing pixel density of the LED printer. Japanese Unexamined Patent Publication (Kokai) No. 7-156422 describes an LED printer for printing image data having a plurality of different kinds of resolution by using one LED head apparatus. This LED printer uses an LED array having LED cells in a pixel pitch of resolution, that is the least common multiple of different kinds of resolution, and collectively turns ON and OFF a plurality of LED cells adjacent to one another as one pixel unit when the resolution is lower. The LED printer described in this reference prints the printing data having a plurality of different resolution by using a high-resolution LED head having a resolution of the least common multiple of these low resolution. For example, the LED printer prints four kinds of printing data having resolution of 240 dpi, 300 dpi, 400 dpi and 600 dpi by an LED head apparatus having resolution of 1,200 dpi as the least common multiple of resolution of the printing data.

Japanese Unexamined Patent Publication (Kokai) No. 7-178959 teaches means for coping with different levels of resolution by making the frequency of a transfer clock signal of image data to be given to an LED head apparatus, on the basis of a clock pulse, variable. The reference teaches to lower the frequency of the transfer clock signal when resolution is low, and to collectively turn ON and OFF a plurality of LED cells adjacent to one another as one pixel unit.

Incidentally, when the printing speed is increased in the LED printer, the frequency of the transfer clock signal to be given to the LED head apparatus becomes correspondingly higher. In order to let a LED printer print different kinds of printing data having different low degrees of resolution, the LED printer has to be equipped with a high resolution LED head apparatus having a resolution of at least the least common multiple of a plurality of such low resolutions. When a high resolution LED head apparatus is provided in the LED printer, the amount of printing pixel data transferred by a shift register increases, and transfer clock signals having a higher frequency become necessary.

For these reasons, high-speed register cells become necessary to constitute the shift register of the LED printer capable of high-speed printing. Since such high-speed shift register cells are expensive, the cost of the LED head apparatus becomes high.

For instance, the frequency F of the transfer clock signal in a continuous printer of 10,000 lines/min (approx. 0.42 cm/line) and a printing width of 43.18 cm (17 inches) can be calculated as follows.

(1) When an LED head for each resolution is used:
 240 dpi: F>27.2 MHz
 300 dpi: F>42.5 MHz
 400 dpi: F>75.5 MHz (2) When three kinds of printing data of 240 dpi, 300 dpi and 400 dpi are printed by LED head apparatus of 1,200 dpi as least common multiple of these resolution:
 240 dpi: F>136.0 MHz
 300 dpi: F>170.0 MHz
 400 dpi: F>226.6 MHz When one LED head apparatus prints the low-resolution printing data of a plurality of kinds in this way, the frequency F of the necessary transfer clock signal increases, and the cost of the LED apparatus becomes high.

SUMMARY OF THE INVENTION

It is therefore a first object of the present invention to provide an economical display data conversion apparatus that includes a display device of a high resolution for a plurality of different low-resolution display data, and can transfer a plurality of different low-resolution display data without increasing the frequency of a transfer clock signal of the display data when these low-resolution display data are displayed at the same resolution as their resolution, to reduce the cost of a display data conversion apparatus.

It is a second object of the present invention to provide an economical LED head apparatus that utilizes the display data conversion apparatus described above, includes a high-resolution LED head for a plurality of different low-resolution printing data, and can transfer a plurality of different low-resolution printing data without increasing the frequency of a transfer clock signal of the printing data when these low-resolution printing data re printed by one LED printer at the same resolution as their resolution, and can reduce the cost of an LED printer apparatus.

To accomplish the objects described above, a light emission control apparatus of an LED array according to the present invention is a display data conversion apparatus for causing a high-resolution display device to display input display data having a plurality of different low resolutions, at the same resolution as that of the input data, the display device having a predetermined number of light emitting cells aligned in a predetermined pitch, the display data conversion apparatus comprising a switch matrix circuit, a shift register, a register stage number changing circuit, wherein the switch matrix circuit includes output terminals for outputting driving signals for driving the light emitting cells of the display device, respectively, a smaller number of input terminals than the number of the output terminals, for inputting display data, a matrix circuit for converting the display data inputted to the input terminals to display data having the same bit number as the number of the output terminals in accordance with resolution of the display data, and resolution signal input terminals for inputting a resolution signal of display data for executing the conversion operation; and wherein the shift register comprises the same number of registers as the number of the input terminals of the switch matrix circuit, each of the registers is cascaded, the output of each of the registers is connected to the input terminal of the register, and short-circuits are connected in parallel with at least one group of a predetermined number of the registers continuously connected to one another, through a select switch; and wherein the short-circuits are selected by means of the select switch in accordance with resolution of the display data, and this changes the number of stage of the registers of the shift register.

In this case, the shift register and the switch matrix circuit is constituted by cascading units each having a size which is an integral fraction of the number of light emitting cells of the light emitting device, and the shift register of each of the units has a plurality of the short-circuits so as to generate short-circuits of different numbers of the registers from the side of the rear stages.

When a plurality of kinds of the low resolutions is R1, R2 and R3, resolution of the display device is Ro, the number of the output terminals of the switch matrix circuit is Ns and the number of the registers inside the shift register is Nr, the output pixel number Ns of the switch matrix is expressed as the least common multiple of Ro/R1, Ro/R2 and Ro/R3, and the number Nr of the registers inside the shift register is expressed as the greatest one of NsR1/R0, NsR2/Ro and NsR2/Ro, and the short-circuits are disposed between the select switch and the output stage of the (NsR1/Ro)th register, between the select switch and the output stage of the (NsR2/Ro)th register and between the select switch and the (NsR2/Ro)th register. In this case, R1, R2 and R3 may be 400, 300 and 240, respectively.

In the display data conversion apparatus having the construction described above, the LED head apparatus according to the present invention can be constituted by connecting an LED array having a large number of LED cells aligned in a predetermined pitch to the post stage of the switch matrix circuit of the display data conversion apparatus through an LED driving circuit, and by converting display data having a plurality of kinds of different resolution to printing data having a plurality of different low resolution.

The present invention provides an economical display data conversion apparatus that includes a high-resolution display device for display data having a plurality of different low resolution, and can transfer a plurality of different low-resolution display data without increasing the frequency of a transfer clock signal of display data when these low-resolution display data are displayed at the same resolution as their resolution. Therefore, the present invention can reduce the cost of the display data conversion apparatus.

The present invention provides also an economical LED head apparatus that utilizes the display data conversion apparatus described above, includes a high-resolution LED head for a plurality of different low-resolution printing data and can transfer a plurality of different low-resolution printing data without increasing the frequency of a transfer clock signal of the printing data when these low-resolution printing data are printed at the same resolution as their resolution by using one LED printer. Therefore, the present invention can reduce the cost of an LED printer apparatus.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given of the conventional LED printer shown in FIGS. 1 to 3.

Figure 1:
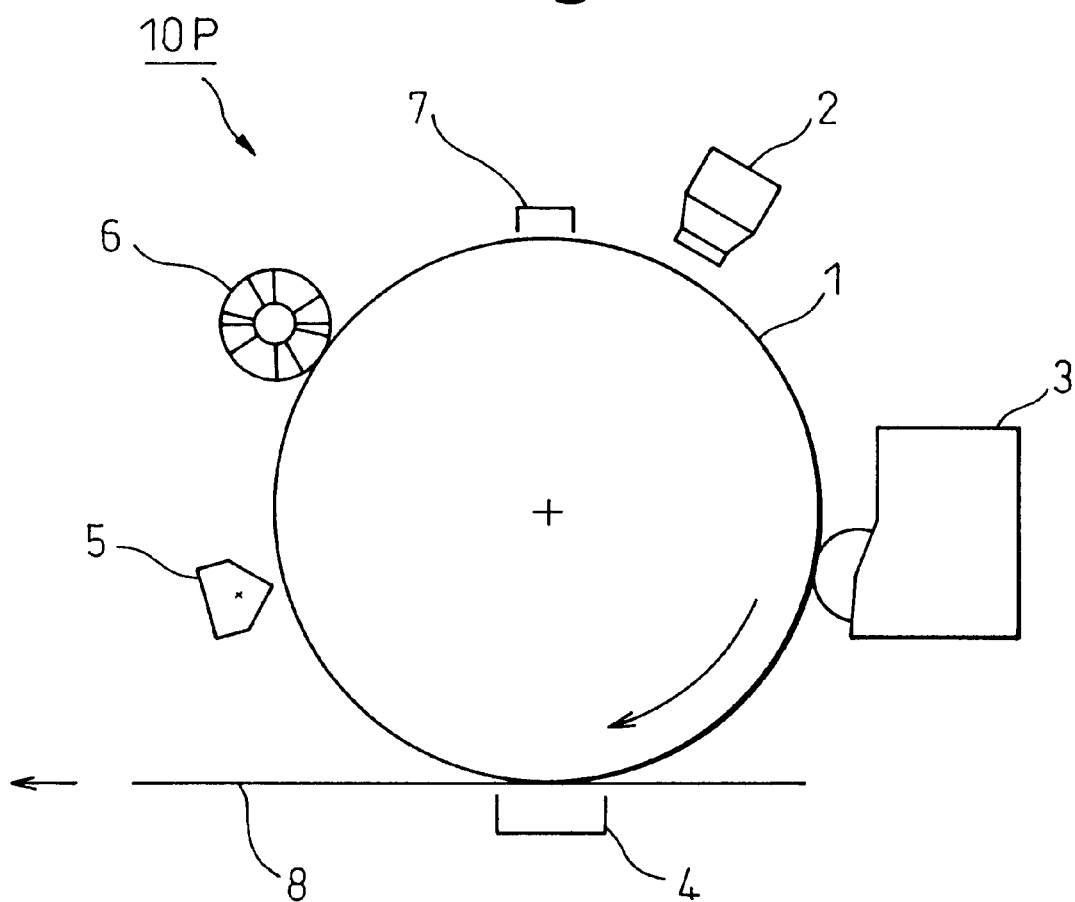
FIG. 1 is an explanatory view showing a construction of a printing unit of an ordinary LED printer.
Figure 2:
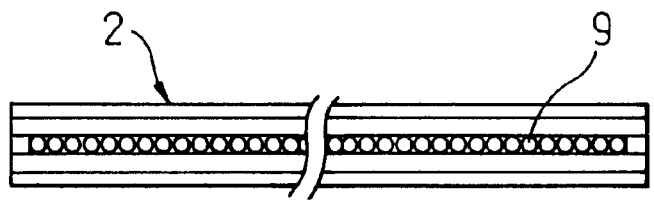
FIG. 2 is a view of the LED array shown in FIG. 1 when it is viewed from the side of a photosensitive drum.

FIG. 1 shows a construction of a printing unit 10P of an ordinary LED printer. A photo-sensitive drum 1 is provided to the printing unit 10P of the LED printer. An LED array 2, a developing device 3, a transferring device 4, a discharger 5, a cleaner 6 and a charger 7 are serially disposed in this order round the photosensitive drum 1. Reference numeral 8 denotes a medium such as a sheet of paper to which printing is made by the transferring device 4. A large number of LED cells 9 are aligned in array to constitute the LED array 2 as shown in FIG. 2.

The photosensitive drum 1 rotates in a direction indicated by an arrow during printing. The LED array 2 emits light as image,data to the photosensitive drum 1 charged by the charger 7, and an electrostatic latent image is formed on the photosensitive drum 1. A toner is caused to adhere by the developing device 3 to the electrostatic latent image with the revolution of the photo-sensitive drum 1, and is then transferred by the transferring device 4 to the medium 8. Thereafter, the portion of the photosensitive drum 1, on which the electrostatic latent image is formed, is discharged by the discharger 5, and is cleaned by the cleaner 6 to the original condition. The charger 7 repeatedly conducts the operation described above.

Figure 3:
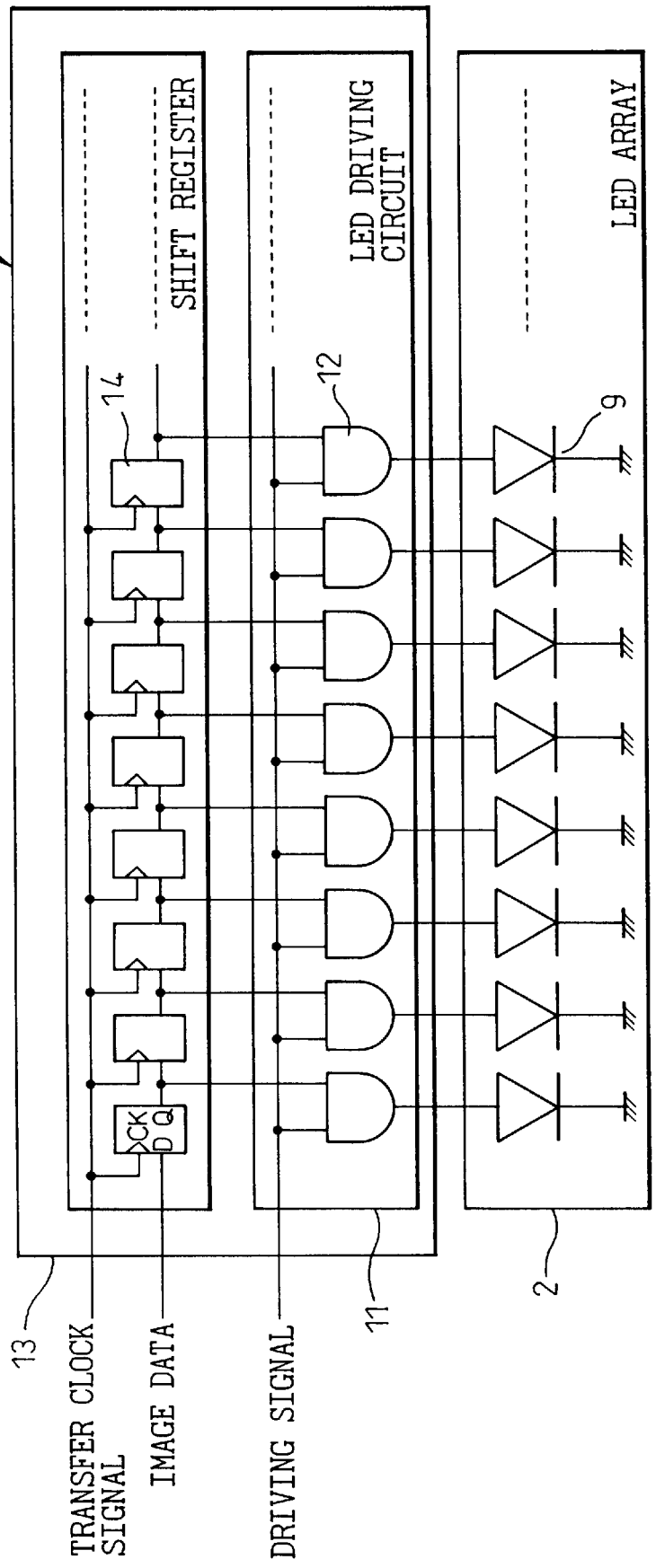
FIG. 3 is a view showing a construction of a light emission control apparatus of a conventional LED array.

A light emitting control circuit 15 of the LED array 2, shown in FIG. 3, controls light emission of the LED array 2 in the printing unit 10P of such an LED printer. In FIG. 3, reference numeral 2 denotes the LED array. The LED cells 9 are aligned in a predetermined pitch. In this embodiment, a cathode of each LED cell 9 of this LED array 2 is grounded and its anode is connected to an output of an AND circuit 12 of an LED driving circuit 11. One of the input terminals of each AND circuit 12 is connected in common, and a driving signal is inputted to it. The other input terminal of each AND circuit 12 is connected to each output terminal of each register 14 of a shift register 13, that is cascaded. A transfer clock signal is inputted to a clock terminal CK of each register 14, and image data is inputted to a signal input terminal D. Each register 14 stores one image data corresponding to one LED cell 9, and the same number of registers 14 as the number of LED cells 9 are therefore disposed.

The arrangement pitch of the LED cells 9 determines the printing pixel density of the LED printer. There is a plurality of kinds of printing resolution of the LED printer, and the LED printer is so constituted as to correspond to these kinds of resolution. Therefore, the LED cells 9 are arranged in the pixel pitch of resolution, that is the least common multiple, of a plurality of different kinds of resolution. When these plural LED cells 9 adjacent to one another are collectively turned ON or OFF in accordance with the printing resolution, this printing resolution can be changed.

When the different kinds of low resolution printing data are of four kinds, that is, 240 dpi, 300 dpi, 400 dpi and 600 dpi, for example, a high-resolution head device using an LED array of 1,200 dpi, that is the least common multiple of these four kinds of resolution, is provided to the LED printer.

When the high-resolution LED head device of 1,200 dpi is provided to the LED printer, however, the quantity of printing pixel data transferred by the shift register becomes great, and a high-frequency transfer clock signal becomes necessary. Therefore, a high-speed expensive device is required to constitute the shift register, eventually inviting the increase of the cost of the LED printer.

Accordingly, it is an object of the present invention to provides a lost-cost display data conversion apparatus that can transfer a plurality of different kinds of low-resolution printing data without elevating a frequency of a transfer clock signal even when ON/OFF control of a high-resolution display device using an LED array is made by display data of low resolution, and thus reduces the cost of an LED printer.

Figure 4:
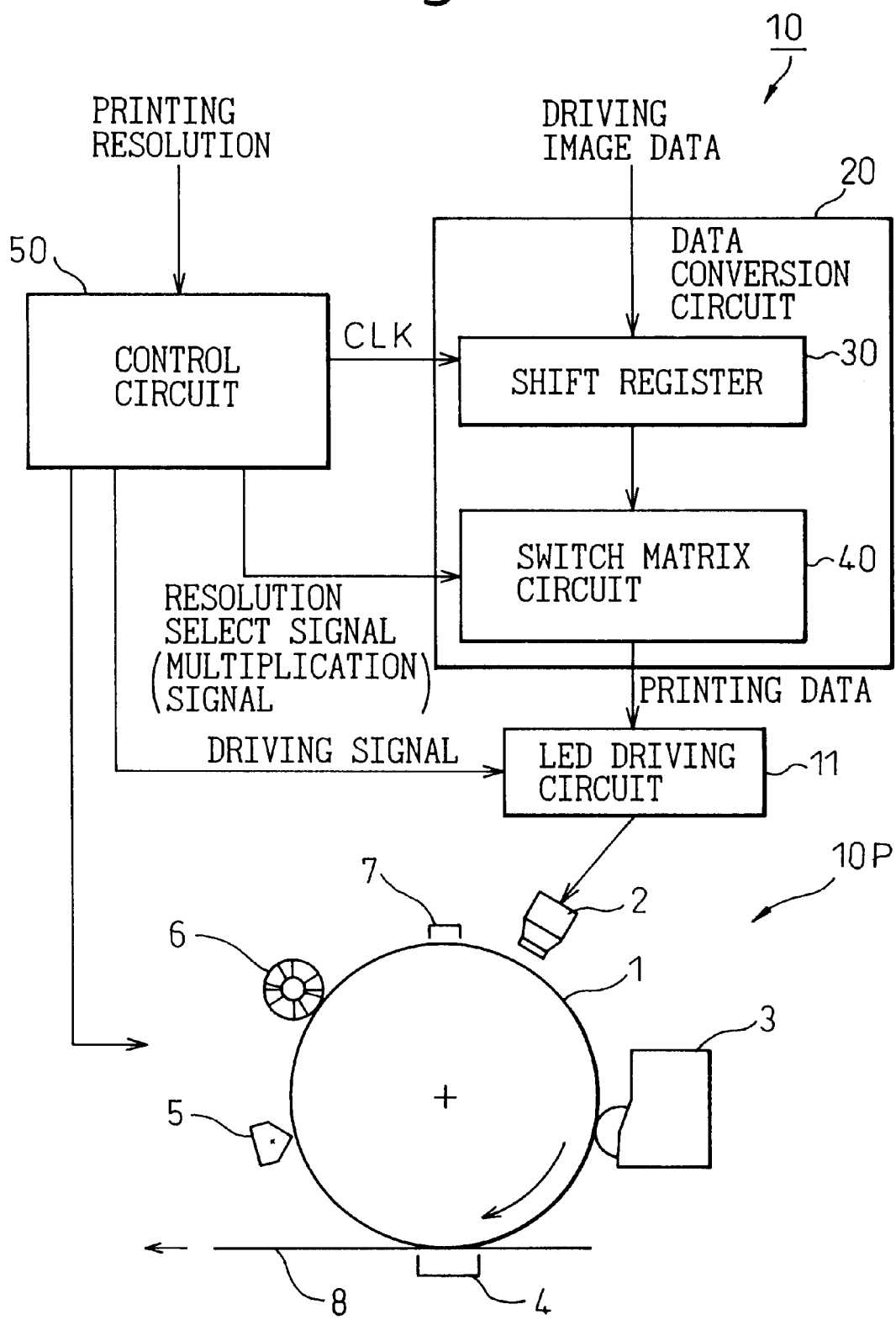
FIG. 4 is a view useful for explaining a construction of an LED printer using a light emission control apparatus of an LED array according to the present invention.

FIG. 4 explains the construction of the LED printer using the display data conversion apparatus according to the present invention. Incidentally, the construction and operation of the printing unit 10P of this LED printer is exactly the same as that of the conventional printing unit 10P explained with reference to FIG. 1. Therefore, the same reference numeral is used to identify the same constituent, and an explanation of such a member is omitted.

The LED printer 10 according to the present invention includes an LED driving circuit 11 connected to the LED array 2 of the printing unit 10P. Input data from a data conversion circuit 20 and a driving signal from a control circuit 50 are inputted to this LED driving circuit 11. The data conversion circuit 20 includes a shift register 30 and a switch matrix circuit 40.

During the printing operation by the LED printer 10, printing image data of a predetermined resolution is inputted to the data conversion circuit 20 and, at the same time, the printing resolution of the printing image data is inputted to the control circuit 50. The printing image data inputted to the LED printer 10 is serial data, and moves inside the shift register 30 of the data conversion circuit 20 in synchronism with the clock signal CLK inputted from the control circuit 50. When the serial data of one line are all stored in the shift register 30, the shift register 30 outputs the data of one line to the switch matrix circuit 40. The switch matrix circuit 40 multiplies the data of one line so inputted and the input data in accordance with a resolution select signal (multiplication signal) inputted from the control circuit 50, and outputs the data as printing data of one line to the LED driving circuit 11. The LED driving circuit 11 executes ON/OFF control of the LED array 2 on the basis of this printing data and executes exposure.

Here, an explanation is given on the construction of the data conversion circuit 20 of the LED printer 10 according to the present invention when printing resolution is of three kinds, i.e., 240 dpi, 300 dpi and 400 dpi. When printing resolution is 240 dpi, 300 dpi and 400 dpi, the LED array of 1,200 dpi, which is the least common multiple of 240 dpi, 300 dpi and 400 dpi, is used. Therefore, this embodiment is explained in the case where printing resolution of 240 dpi, 300 dpi and 400 dpi is displayed at the same resolution by the LED array of 1,200 dpi.

One dot of the printing image data of 240 dpi corresponds to 5 pixels of the printing pixel of 1,200 dpi. Similarly, one dot of the printing pixel data of 300 dpi corresponds to 4 pixels, and one dot of the printing image data of 400 dpi corresponds to 3 pixels. Therefore, the data conversion circuit 20 shown in FIG. 4 may comprise some multiples of 60 stages as the least common multiple of the 5, 4 and 3 pixels. Then, 12 dots of the printing pixel data of 240 dpi may be extended to 60 dots, 15 dots of the printing image data of 300 dpi, to 60 dots, and 20 dots of the printing image data of 400 dpi, to 60 dots.

Assuming that the number of the LED cells 9 arranged in the LED array is 6,000 cells, for example, the data conversion circuit 20 may extend 1,200 dots of the printing image data of 240 dpi to 6,000 dots, 1,500 dots of the printing image data of 300 dpi to 6,000 dots, and 2,000 dots of the printing image data of 400 dpi to 6,000 dots. In this case, the data conversion circuit 20 according to the present invention includes the shift register 30 and the switch matrix circuit 40. The multiplication ratio of the switch matrix circuit 40 can be set to 3 to 5 times. The switch matrix circuit 40 has the number of input terminals of 2,000 and the number of output terminals of 6,000. The number of registers of the shift register 30 is 2,000.

In the case where the printing image data is 240 dpi, therefore, when the printing image data is inputted to the shift register 30, the shift register 30 outputs the printing image data of 1,200 bits to the switch matrix circuit 40 at the point when the printing image data of 1,200 bits is inputted. In this instance, the multiplication signal (5 times, in this case), when printing resolution is 240 dpi, is inputted from the control circuit 50 to the switch matrix circuit 40. In consequence, the matrix circuit inside the switch matrix circuit 40 multiplies the input data of 1,200 bits by 5 times, converts the input data to the printing data of 6,000 bits and outputs this data to the LED driving circuit 11.

Similarly, when the printing image data is 300 dpi or 400 dpi, the printing image data of 1,500 bits or 2,000 bits is outputted to the switch matrix circuit 40 at the point when the printing image data of 1,500 bits or 2,000 bits is inputted to the shift register 30. At this time, the multiplication signal (4 times in the case of 300 dpi or 3 times in the case of 400 dpi), when printing resolution is 300 dpi or 400 dpi, is inputted from the control circuit 50 to the switch matrix circuit 40. Consequently, the matrix circuit inside the switch matrix circuit 40 multiplies the input data of 1,500 bits by 4 times and the input data of 2,000 bits by 3 times, converts both of the input data to the printing data of 6,000 bits, and outputs the printing data to the LED driving circuit 11.

Figure 5:
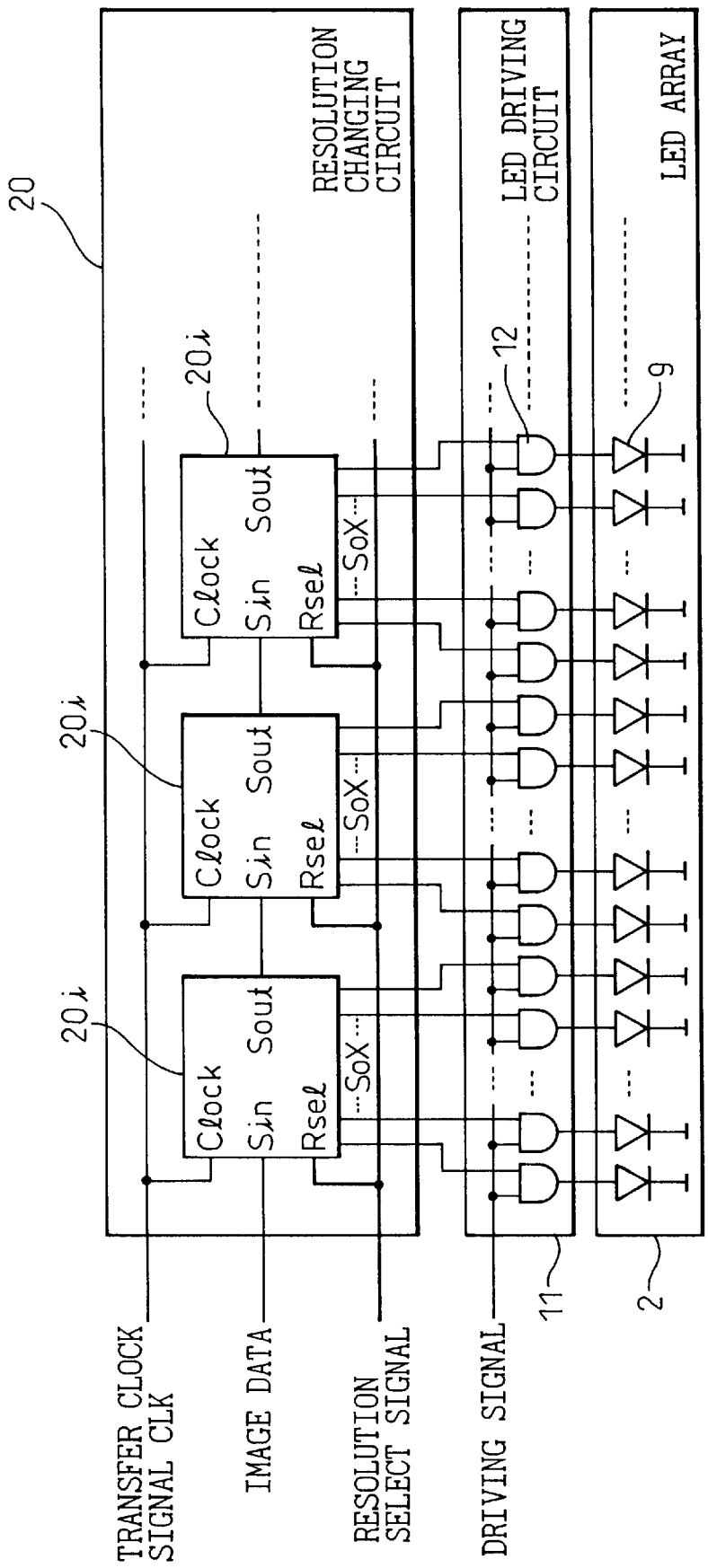
FIG. 5 is a circuit diagram showing a construction of an example of a resolution changing circuit.

On the other hand, the shift register 30 and the switch matrix circuit 40 inside the data conversion circuit 20 can be divided into a plurality of small data conversion units 20*i* each comprising a pair of a shift register and a switch matrix as shown in FIG. 5. The constructions of the LED driving circuit 11 and the LED array 2 remain unchanged. In this case, the circuit arrangement is made so as to input the transfer clock signal CLK and the resolution select signal to each data conversion unit 20*i*. As to the image data, the data conversion units 20*i* are cascaded with one another so that the output Sout of the first data conversion unit 20A is applied to the input Sin of the next data conversion unit 20B.

When the number of the LED cells 9 arranged in the LED array 2 is 6,000 in the same way as in the embodiment described above, for example, the data conversion circuit 20 can be constituted by 100 data conversion units 20*i*. In this case, 20 stages of a shift register and a switch matrix circuit having the number of input terminals of 20 and the number of output terminals of 60 exist inside one data conversion unit 20*i*.

Figure 6:
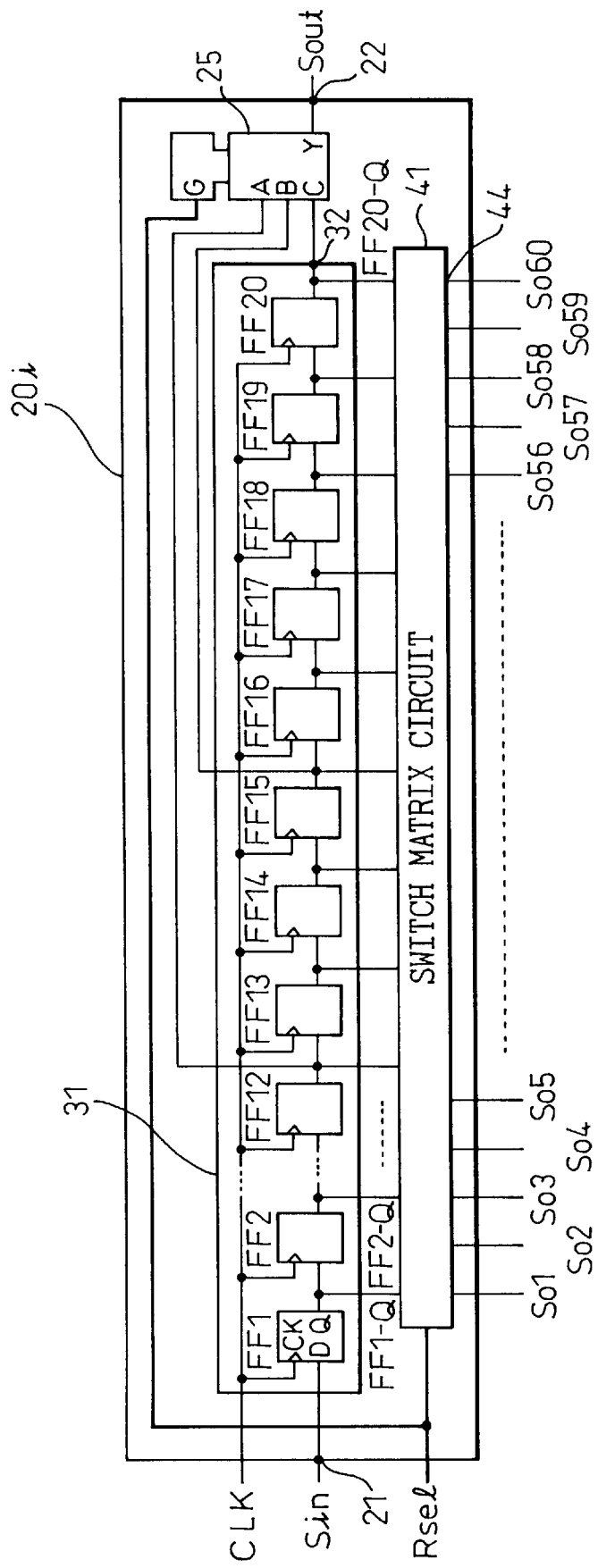
FIG. 6 is a circuit diagram showing a construction of an example of a resolution changing unit.
Figure 7:
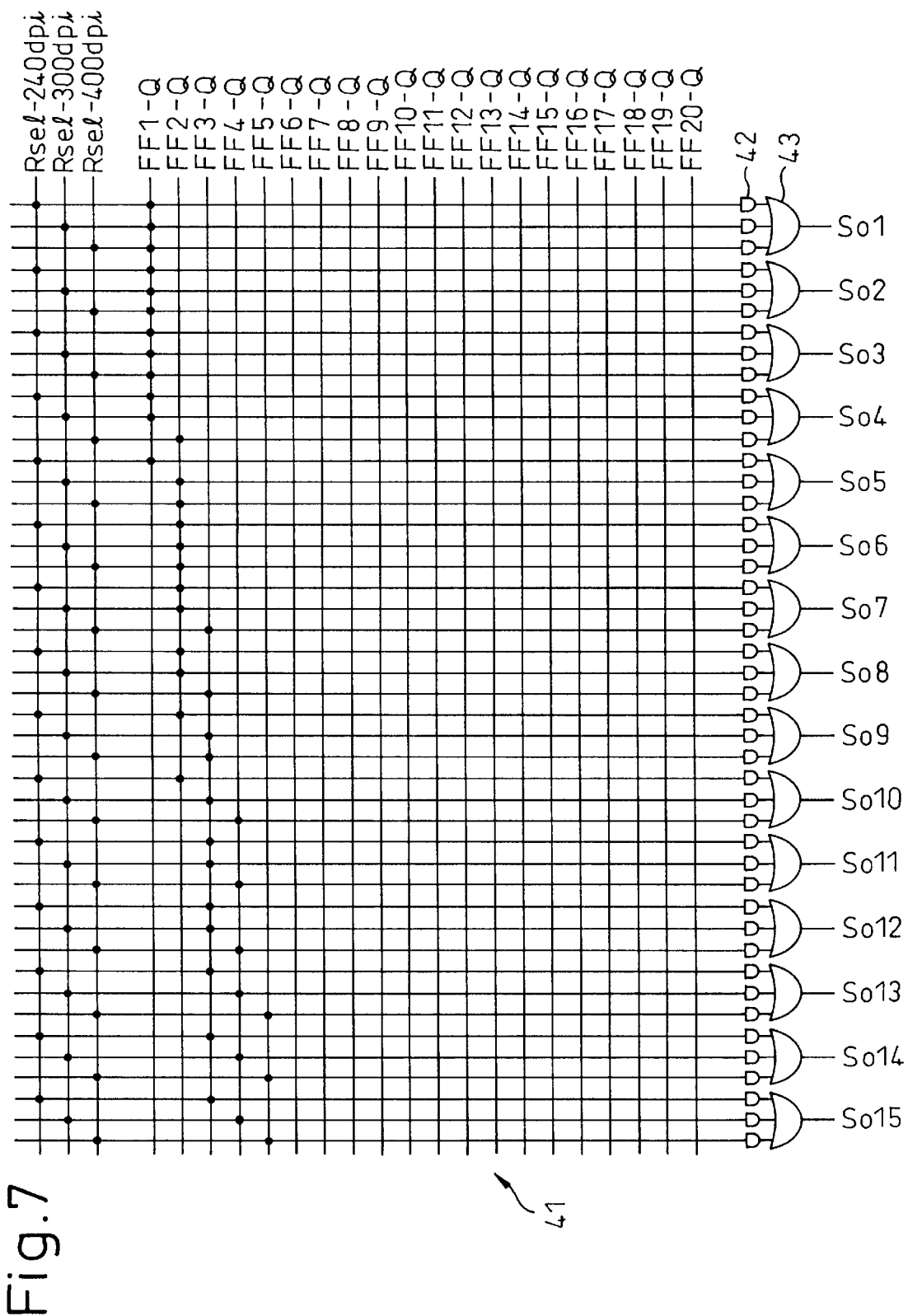
FIG. 7 is a partial circuit diagram showing in detail the switch matrix circuit shown in FIG. 6.

FIG. 6 shows the internal construction of one data conversion unit 20*i*. A shift register 31 comprising 20 registers FF1 to FF20 and a switch matrix circuit 41 having 20 input terminals and 60 output terminals 44 exist inside the data conversion unit 20*i*. Signals FF1-Q to FF20-Q from the output terminals of the registers FF1 to FF20 are inputted to the 20 input terminals, and 60 output terminals 44 output respective output signals So1 to So60. The shift register 31 of the data conversion unit 20*i* for storing the printing data (dots) can store a maximum of 20-dot printing data. The printing data Sin is inputted from the input terminal 21 of the data conversion unit 20*i* and is serially transferred by the clock signal CLK inside the registers FF1 to FF20.

A resolution select signal Rsel, that represents resolution of the printing data Sin inputted from the input terminal 21, is inputted to the data conversion unit 20*i*. The resolution select signal Rsel is hereby a The output signal of each register FF1 to FF20 of the shift register 31 is inputted to the FF1-Q to FF20-Q switch matrix circuit 41, where the output signal is extended to the 60-dot printing pixel in accordance with the condition of the resolution select signal Rsel. The output signals of the registers FF1 to FF20 of the shift register 31 are not always used wholly, but are used in the following way.

(1) In the case of 240 dpi (when Rsel-240 dpi is ON)
The 12-dot printing image data stored in the registers FF1 to FF12 are used. In the switch matrix circuit 41, the 12-dot printing image data is extended 5 times to the 60-dot printing image data, and output signals So1 to So60 are obtained.

(2) In the case of 300 dpi (when Rsel-300 dpi is ON)
The 15-dot printing image data stored in the registers FF1 to FF15 are used. In the switch matrix circuit 41, the 15-dot printing image data is extended 4 times to the 60-dot printing image data, and output signals So1 to So60 are obtained.

(3) In the case of 400 dpi (when Rsel-400 dpi is ON)
The 20-dot printing image data stored in the registers FF1 to FF20 are used. In the switch matrix circuit 41, the 20-dot printing image data is extended 3 times to the 60-dot printing image data, and output signals So1 to So60 are obtained.

Figure 8:
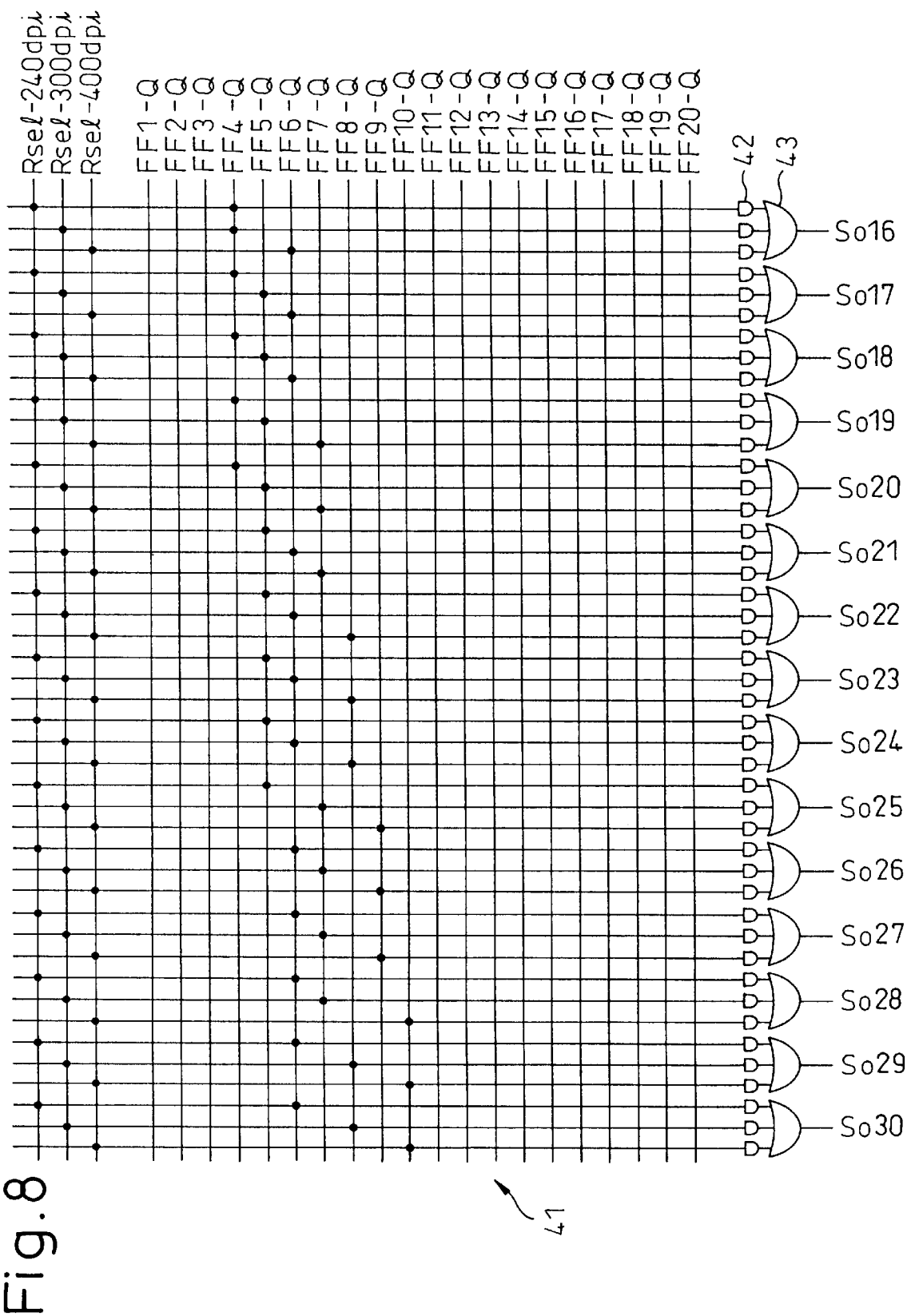
FIG. 8 is a partial circuit diagram showing in detail the switch matrix circuit shown in FIG. 6.
Figure 9:
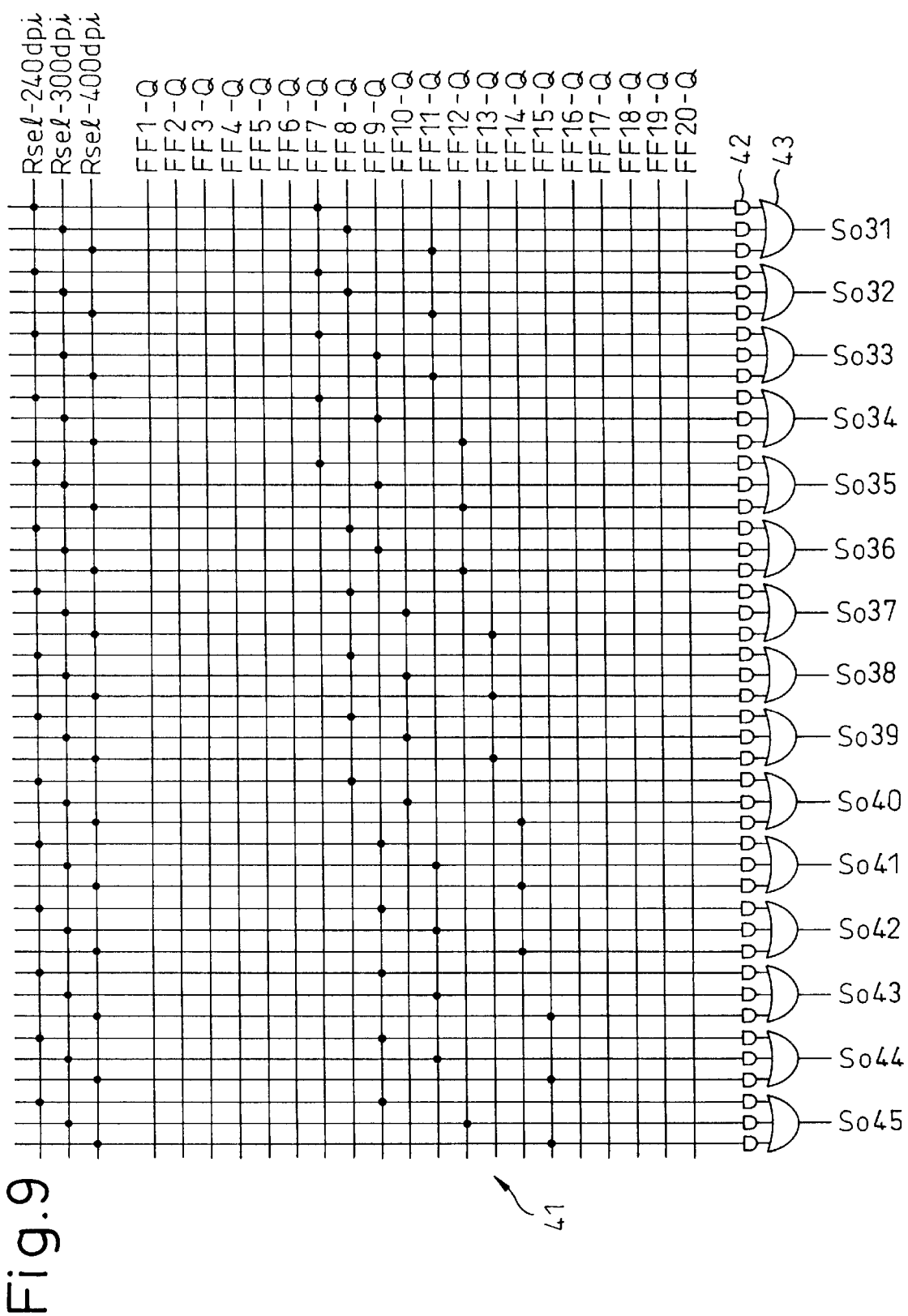
FIG. 9 is a partial circuit diagram showing in detail the switch matrix circuit shown in FIG. 6.
Figure 10:
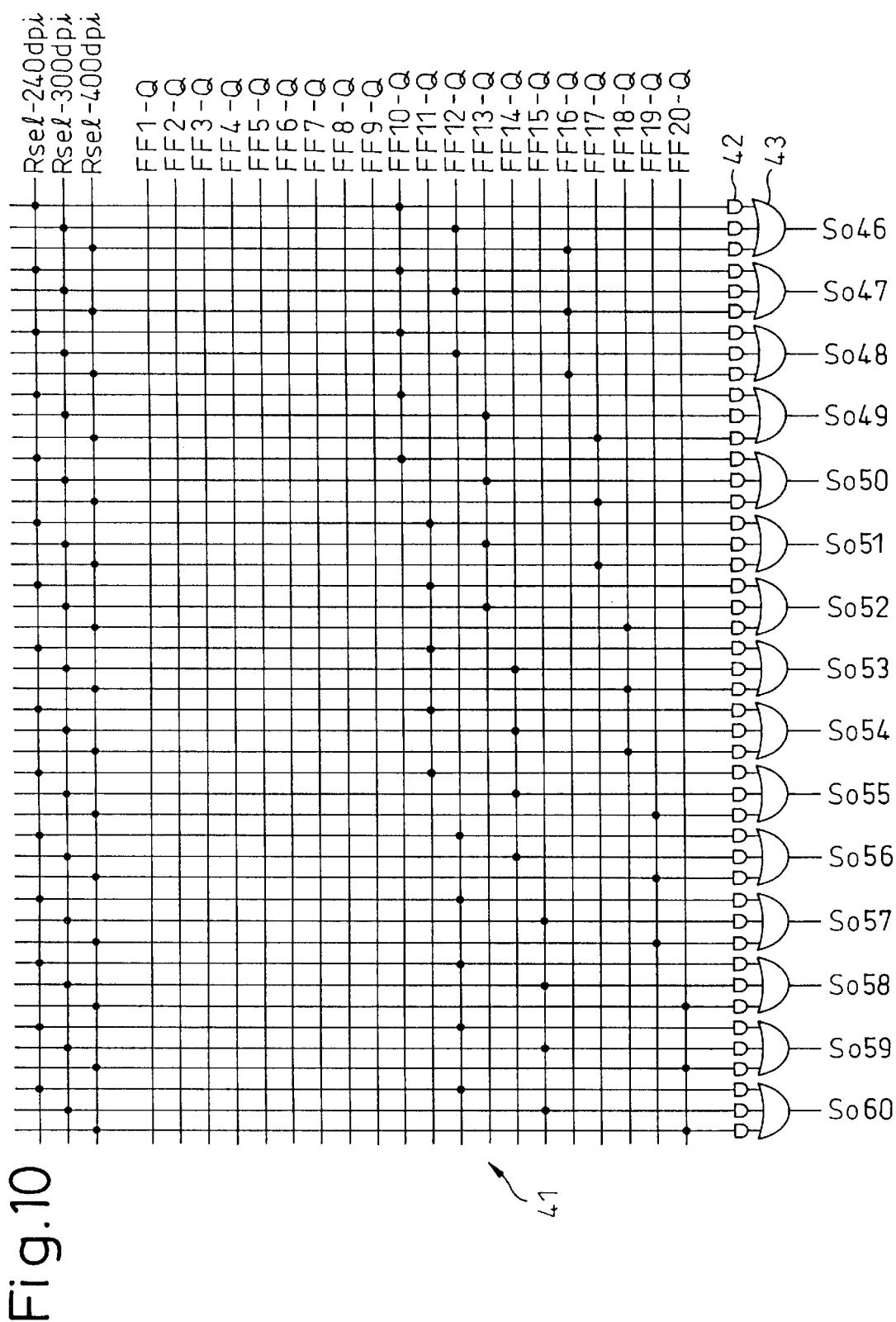
FIG. 10 is a partial circuit diagram showing in detail the switch matrix circuit shown in FIG. 6.

In FIGS. 7 to 10, the construction of the switch matrix circuit 41 is shown divided into four parts in detail. The circuits shown in FIGS. 8, 9 and 10 are serially connected, in practice, to the left side of the circuit shown in FIG. 7. The switch matrix circuit 41 is a matrix-like circuit, and has 23 lines in the transverse direction. The resolution select signals Rsel-240 dpi, Rsel-300 dpi and Rsel-400 dpi are inputted to three lines, and the signals FF-1Q to FF20-Q from the output terminals of the registers FF1 to FF20 are inputted to 20 lines, respectively. 3-bit signal of Rsel-240 dpi, Rsel-300 dpi and Rsel-400 dpi, and any one of these bits is turned ON in such a manner as to correspond to resolution of the inputted printing data. The resolution select signal Rsel is inputted to the switch matrix circuit 41 and also to an input terminal G of a select circuit 25 interposed between the shift register 31 and the output terminal 22 of the resolution conversion unit 20*i*.

The select circuit 25 includes three input terminals A, B and C and an output terminal Y besides the input terminal G. The input terminal A is connected to the output of the twelfth stage register FF12 of the shift register 31. The input terminal B is connected to the output of the fifteenth stage register FF15 of the shift register 31. The input terminal C is connected to the output of the twentieth stage register FF20 of the shift register 31, that is, to the output terminal 32 of the shift register 31. On the other hand, the output terminal Y is connected to the output terminal 22 of the data conversion unit 20*i*. The output terminal 22 of the data conversion unit 20*i* outputs an output signal Sout for cascading each data conversion unit 20*i*.

The select circuit 25 connects any one of the input terminals A, B and C to the output terminal Y in accordance with the kind of the resolution signal Rsel (the signal that turns ON any one of the three bits of Rsel-240 dpi, Rsel-300 dpi and Rsel-300 dpi). In this embodiment, when the data select signal Rsel represents that the printing data is 240 dpi, the select circuit 25 selects the output of the twelfth register FF12 of the shift register 31 and the data conversion circuit 20*i* outputs this output. Similarly, when the printing data is 300 dpi or 400 dpi, respectively, the select circuit 25 selects the output of the fifteenth or twentieth register FF15 or FF20 of the shift register 31 by the resolution select signal Rsel, and the data conversion circuit 20*i* outputs this output.

On the other hand, the switch matrix circuit 41 has 60 output terminals 44, and these output terminals have a plurality of lines in the longitudinal direction crossing the 23 transverse lines, respectively. Each transverse line and each longitudinal line crossing the former are logically connected to each other at a point represented by a black circle. The end portion of each longitudinal line is connected to the AND circuit 42. The outputs of these AND circuits 42 are taken out through OR circuits 43, and are outputted to one output terminal 44 of the switch matrix circuit 41.

In the construction of the switch matrix circuit 41 shown in FIGS. 7 to 10, each longitudinal line is always connected logically to the transverse line at two points. When the ON signal is inputted to both of the two points, the ON signal can be outputted from the AND circuit 42. Incidentally, one longitudinal line shown in FIGS. 7 to 10 practically represents two lines. This will be explained with reference to FIG. 11.

Figure 11:
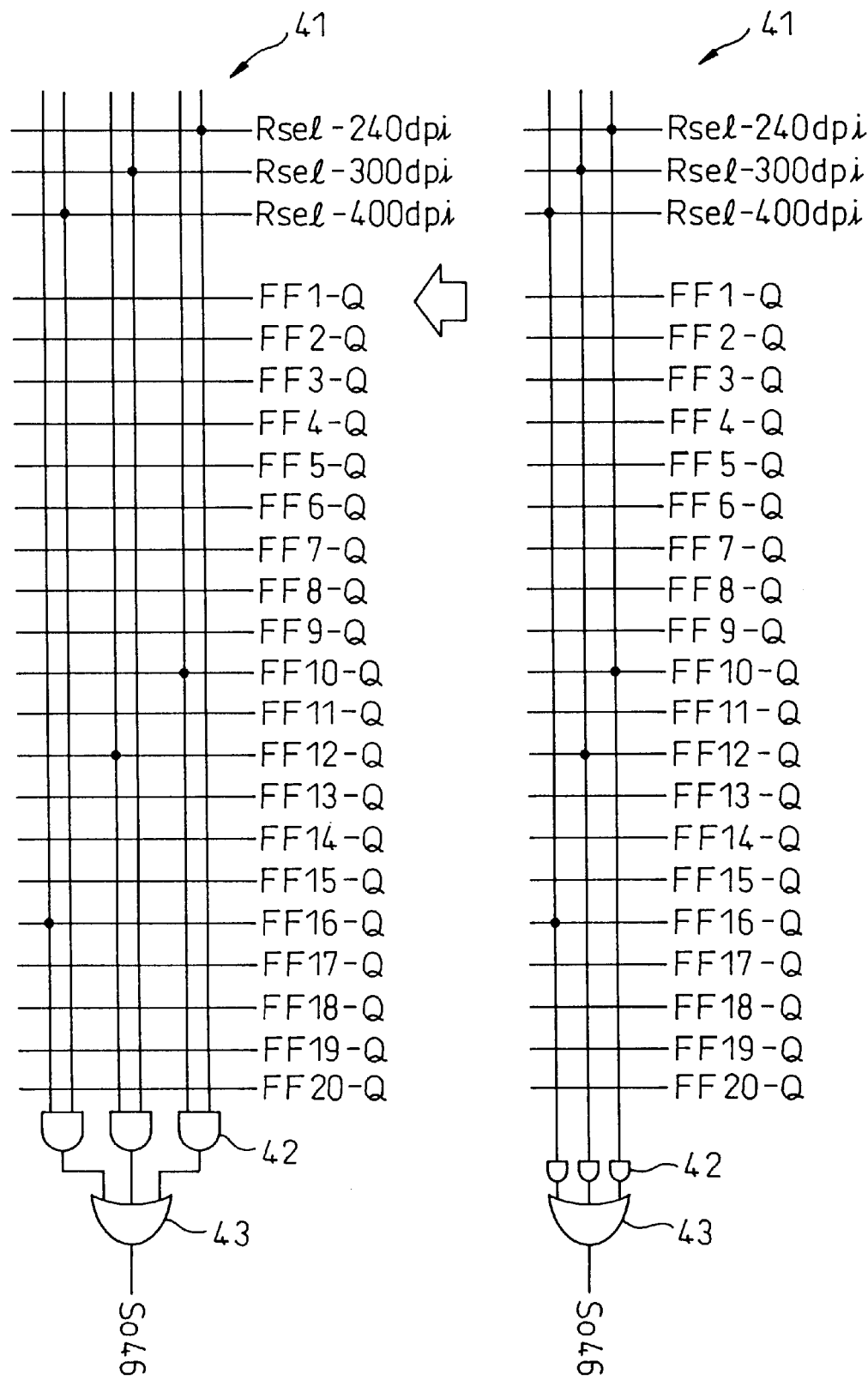
FIG. 11 is a comparative circuit diagram useful for explaining omission in the switch matrix circuit shown in FIGS. 7 to 10.

FIG. 11 explains in detail the practical circuit construction of the switch matrix circuit 41 at the portion at which the output signal So46 is outputted, in such a manner as to correspond to the illustration shown in FIGS. 7 to 10. In practice, two longitudinal lines are disposed for each AND circuit 42. One of the longitudinal lines is logically connected in practice at only one position. Therefore, when the printing resolution is 240 dpi in the left-side circuit shown in FIG. 11, for example, the AND circuit 42 outputs the ON signal when the ON signal is applied to the line of the resolution select signal Rsel-240 dpi and to the output FF10-Q of the register, and these members become active. In this case, the output signal So46 of the register is the signal representing ON.

Figure 12:
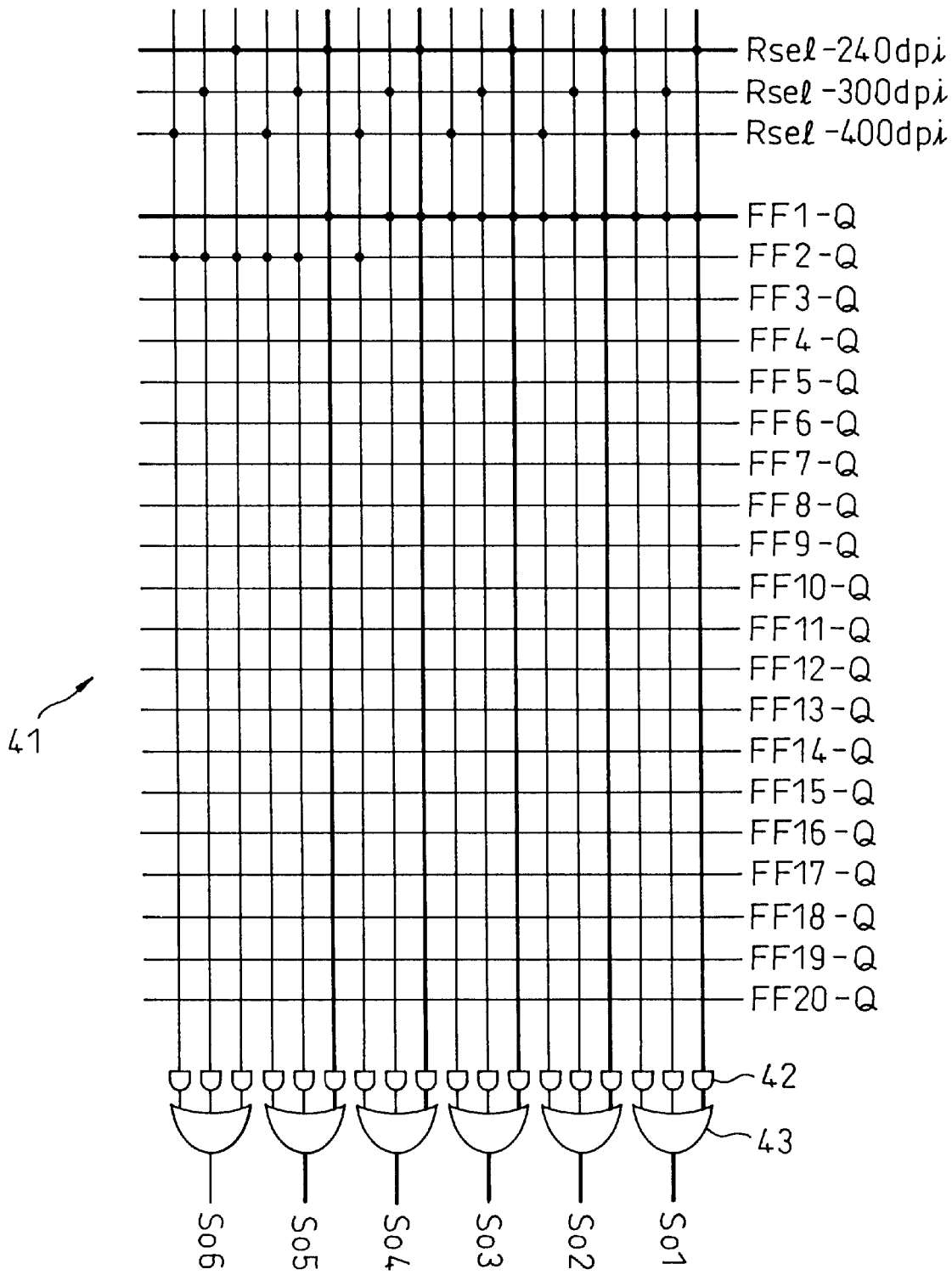
FIG. 12 is a view useful for explaining a part of the operation of the switch matrix circuit shown in FIG. 7 when 240 dpi is selected in the circuit.
Figure 13:
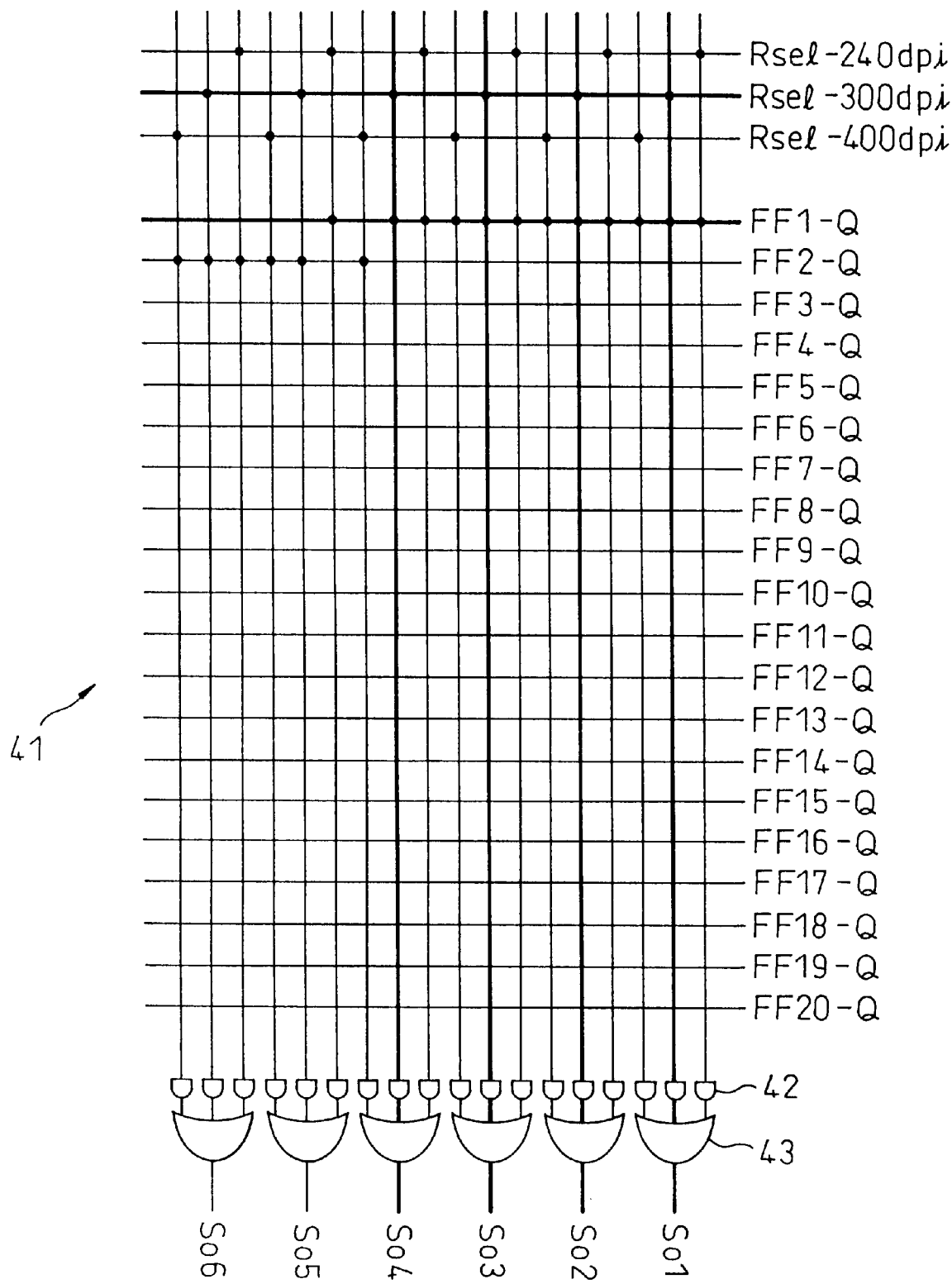
FIG. 13 is a view useful for explaining a part of the operation of the switch matrix circuit shown in FIG. 7 when 300 dpi is selected in the circuit.
Figure 14:
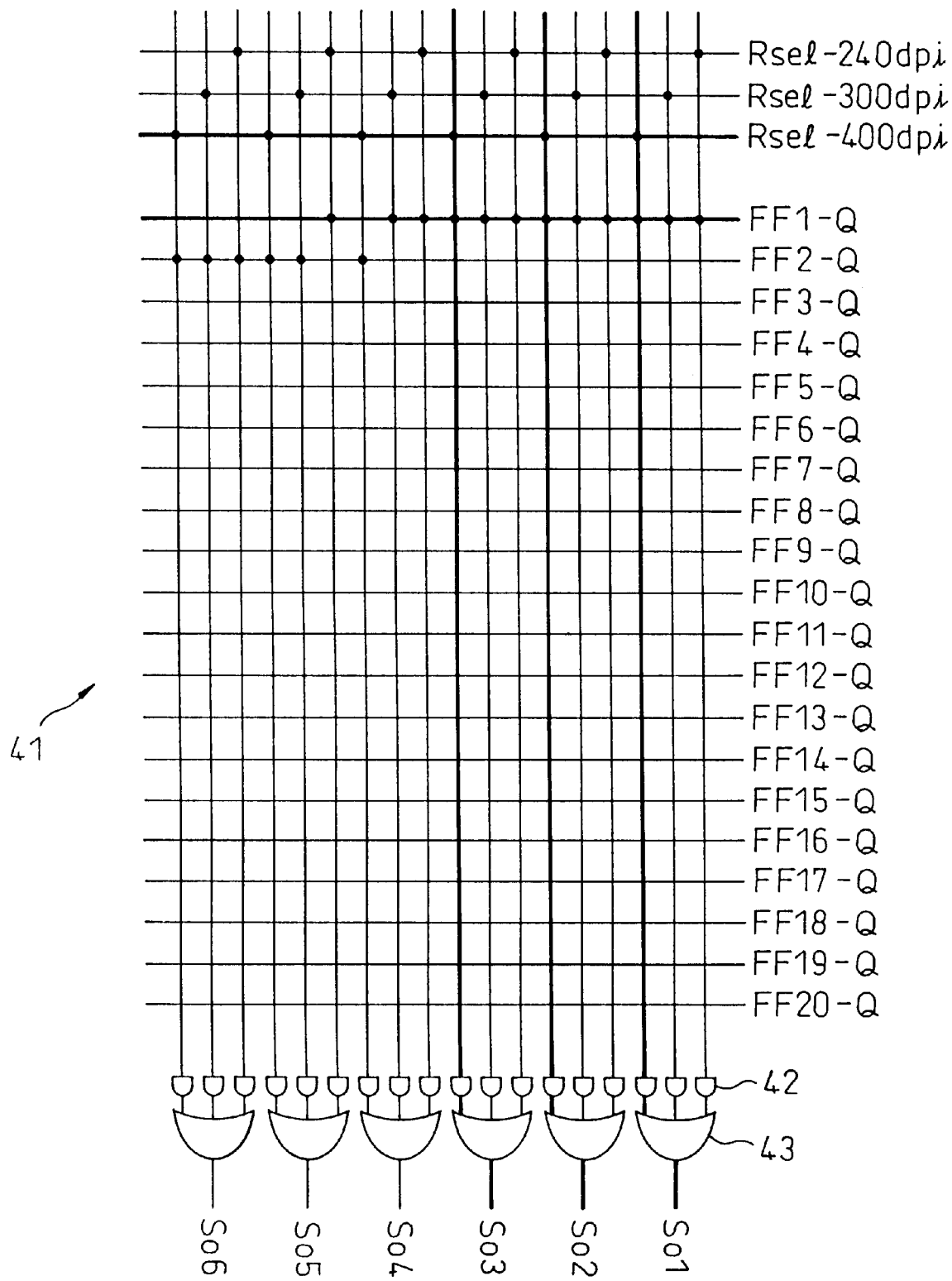
FIG. 14 is a view useful for explaining a part of the operation of the switch matrix circuit shown in FIG. 7 when 400 dpi is selected in the circuit.

The operation of the switch matrix circuit 41 is now explained about the cases where printing resolution is 240 dpi, 300 dpi and 400 dpi, respectively, under the condition where the ON signal is applied to only the output FF1-Q of the first stage register of the shift register 31 and this register becomes active, with reference to FIGS. 12 to 14.

FIG. 12 shows the operation of the switch matrix circuit 41 when printing resolution is 240 dpi. When printing resolution is 240 dpi, the line of the resolution select signal Rsel-240 dpi is active as represented by a thick line. When the ON signal is applied to only the output FF1-Q of the first stage register of the shift register 31, the line of the output FF1-Q is active as represented by the thick line. At this time, only the line that logically connects the two lines of Rsel-240 dpi and FF1-Q becomes active as represented by the thick line. Only the output signals So1 to So5 of the registers become active due to the functions of the AND circuit 42 and the OR circuit 43, and turn ON the corresponding LED device.

FIG. 13 shows the operation of the switch matrix circuit 41 when the printing resolution is 300 dpi. When the printing resolution is 300 dpi, the line of the resolution select signal Rsel-300 dpi is active as represented by the thick line. When the ON signal is applied to only the output FF1-Q of the first stage register of the shift register 31, the line of the output FF1-Q is active as represented by the thick line. At this time, only the line that logically connects the two line of Rsel-300 dpi and FF1-Q becomes active as represented by the thick line, and only the output signals So1 to So4 of the registers become active due to the functions of the AND circuit 42 and the OR circuit 43, and turn ON the corresponding LED devices.

FIG. 14 shows the operation of the switch matrix circuit 41 when the printing resolution is 400 dpi. When the printing resolution is 400 dpi, the line of the resolution select signal Rsel-400 dpi is active as represented by the thick line. When the ON signal is applied to only the output FF1-Q of the output of the first stage register of the shift register 31, the line of the output FF1-Q is active as represented by the thick line. At this time, only the line that logically connects the two lines of Rsel-400 dpi and FF1-Q is active as represented by the thick line as described above, and only the output signals So1 to So3 of the registers are active, and turn ON the corresponding LED devices.

As described above, when the printing image data of each of 240 dpi, 300 dpi and 400 dpi is converted to 1,200 dpi as the least common multiple of their resolution, too, the number of dots applied to the shift register for acquiring the pixel data of 60 pixels (60/1,200 inch width) of 1,200 dpi is 12 dots in the case of 240 dpi, 15 dots in 300 dpi and 20 dots in 400 dpi. Therefore, no increase occurs in converting them to 1,200 dpi, and the number of transfer clocks necessary for acquiring the pixel data of 60-pixels does not increase, either.

When printing of a 17-inch width is made in this construction, for example, the printing image data of 4,080 dots when the printing data is 240 dpi, 5,100 dots for 300 dpi and 6,800 dots for 400 dpi may be applied to the LED head apparatus, and the number of necessary transfer clock signals is the same as the number of the dots of the printing image data applied. The number of clocks of the transfer clock signals required hereby is the same as the number of clocks required when the LED head apparatus dedicated to each resolution is used, and the clock frequency does not rise.

In the embodiment explained with reference to FIGS. 6 to 14, the LED array 2 is allowed to emit light in such a manner as to correspond to resolution of 240 dpi, 300 dpi and 400 dpi. In addition to these three kinds of resolution, light emission can be effected at the same resolution by using the LED array having resolution of 1,200 dpi to the printing image data having resolution of 600 dpi. In this case, the shift register inside one data conversion unit is provided with 30 registers by the selection of short-circuit circuits so that the registers up to the $12^{th}$ stage output the data when resolution is 240 dpi, the registers up to the $15^{th}$ stage output the data when 300 dpi, the registers up to $20^{th}$ stage output the data when 400 dpi, and the registers of all the stages output the data when 600 dpi. In this case, the switch matrix circuit has the number of inputs of 30 and the number of outputs of 60, and the number of data multiplication of the switch matrix circuit is from 2 times (when 600 dpi) to 5 times (when 240 dpi).

As described above, the display data conversion apparatus according to the present invention has a high-resolution display for a plurality of different kinds of low-resolution display data, and can transfer these different low-resolution display data when these display data having different low-resolution are displayed at the same resolution as that of the data, without raising the frequency of the transfer clock signals of the display data. As a result, the present invention can provide at a low cost a display data conversion apparatus having a high transfer rate.

By utilizing this display data conversion apparatus, the present invention can also provide an LED head apparatus that includes a high-resolution LED head for printing data of a plurality of different low resolution, and can transfer these different low-resolution printing data without raising the frequency of the transfer clock signals of the printing data when the printing data is printed by one LED printer at the same resolution as resolution of the printing data. As a result, the present invention can provide an economical LED head having a high transfer rate.

What is claimed is:

1. A display data conversion apparatus for causing a high-resolution display device to display input display data having a plurality of different low resolutions at the same resolution as that of said input data, said display device having a predetermined number of light emitting cells aligned in a predetermined pitch, said display data conversion apparatus comprising a switch matrix circuit, a shift register, and a register stage number changing circuit; wherein said switch matrix circuit includes:

output terminals for outputting driving signals for driving said light emitting cells of said display device, respectively;

a smaller number of input terminals than the number of said output terminals, for inputting display data;

a matrix circuit for converting said display data inputted to said input terminals to display data having the same bit number as the number of said output terminals in accordance with resolution of said display data; and resolution signal input terminals for inputting a resolution signal of display data for executing the conversion operation;

wherein said shift register comprises the same number of registers as the number of said input terminals of said switch matrix circuit, each of said registers is cascaded, the output of each of said registers is connected to the input terminal of said register, and short-circuits are connected in parallel with at least one group of a predetermined number of said registers continuously connected to one another, through a select switch; and wherein said register stage number changing circuit selects said short-circuit by means of said select switch in accordance with resolution of said display data, and changes the number of stage of said register of said shift register.

2. A display data conversion apparatus according to claim 1, wherein each of said shift register and said switch matrix circuit is constituted by cascading units each having a size which is an integral fraction of the number of light emitting cells of said light emitting device, and said shift register of each of said units has a plurality of said short-circuits so as to generate short-circuits of different numbers of said registers from the side of the rear stages.

3. A display data conversion apparatus according to claim 2, wherein, when a plurality of kinds of said low resolutions is R1, R2 and R3, the resolution of said display device is Ro, the number of said output terminals of said switch matrix circuit inside said unit is Ns, and the number of said registers inside said shift register is Nr, the number Ns of the output pixels of said switch matrix is expressed as the least common multiple of Ro/R1, Ro/R2 and Ro/R3, the number Nr of said registers inside said shift register is expressed as the greatest one of NsR1/Ro, NsR2/Ro and NsR2/Ro, and said short-circuits are disposed between said select switch and the output stage of the (NsR1/Ro)th register, between said select switch and the output stage of the (NsR2/Ro)th register and between said select switch and the (NsR2/Ro)th register.

4. A display data conversion apparatus according to claim 3, wherein said R1, R2 and R3 are 400, 300 and 240, respectively.

5. An LED head apparatus including a display data conversion apparatus for causing a high-resolution display device to display input display data having a plurality of different low resolution at the same resolution as that of said input data, said display device having a predetermined number of light emitting cells aligned in a predetermined pitch, said display data conversion apparatus comprising a switch matrix circuit, a shift register, a register stage number changing circuit, an LED driving circuit connected to a post-stage of said switch matrix circuit, and an LED array having a large number of LED cells aligned in line in a predetermined pitch, and connected to said LED driving circuit;

wherein said switch matrix circuit includes:
output terminals for outputting driving signals for driving said light emitting cells of said display device, respectively;
a smaller number of input terminals than the number of said output terminals, for inputting display data;
a matrix circuit for converting said display data inputted to said input terminals to display data having the same bit number as the number of said output terminals in accordance with resolution of said display data; and
resolution signal input terminals for inputting a resolution signal of display data for executing the conversion operation;

wherein said shift register comprises the same number of registers as the number of said input terminals of said switch matrix circuit, each of said registers is cascaded, the output of each of said registers is connected to the input terminal of said register, and short-circuits are connected in parallel with at least one group of a predetermined number of said registers continuously connected to one another, through a select switch; and wherein said register stage number changing circuit selects said short-circuit by means of said select switch in accordance with resolution of said display data, and changes the number of stage of said register of said shift register.

6. An LED head apparatus according to claim 5, wherein each of said shift register and said switch matrix circuit is constituted by cascading units each having a size which is an integral fraction of the number of light emitting cells of said light emitting device, and said shift register of each of said units has a plurality of short-circuits so as to generate short-circuit of different numbers of said registers from the side of the rear stages.

7. A display data conversion apparatus according to claim 6, wherein, when a plurality of kinds of said low resolution are R1, R2 and R3, resolution of said display device is Ro, the number of said output terminals of said switch matrix circuit is Ns and the number of said registers inside said shift register is Nr;

the output pixel number Ns of said switch matrix is expressed as the least common multiple of Ro/R1, Ro/R2 and Ro/R3, and the number Nr of said registers inside said shift register is expressed as the greatest one of NsR1/R0, NsR2/Ro and NsR2/Ro; and said short-circuits are disposed between said select switch and the output stage of the (NsR1/Ro)th register, between said select switch and the output stage of the (NsR2/Ro)th register and between said select switch and the (NsR2/Ro)th register.

8. A display data conversion apparatus according to claim 7, wherein said R1 is 400, said R2 is 300 and said R3 is 240.

* * * * *